J. C. SPENCE.
ABRASIVE WHEEL CENTERING AND BALANCING DEVICE.
APPLICATION FILED SEPT. 27, 1917.

1,305,978.

Patented June 3, 1919.

INVENTOR
JOHN C. SPENCE
BY
Clayton L. Jenks
ATTORNEY

WITNESSES
L. F. Butterfield
E. H. Reed

UNITED STATES PATENT OFFICE.

JOHN C. SPENCE, OF WORCESTER, MASSACHUSETTS, ASSIGNOR TO NORTON COMPANY, A CORPORATION OF MASSACHUSETTS.

ABRASIVE-WHEEL CENTERING AND BALANCING DEVICE.

1,305,978.  Specification of Letters Patent.  Patented June 3, 1919.

Application filed September 27, 1917. Serial No. 193,596.

*To all whom it may concern:*

Be it known that I, JOHN C. SPENCE, a citizen of the United States of America, residing at Worcester, in the county of Worcester and State of Massachusetts, have invented certain new and useful Improvements in Abrasive-Wheel Centering and Balancing Devices, of which the following is a full, clear, and exact specification.

My invention relates to grinding wheel balancing devices and more particularly to grinding wheels having a rigid centering and wheel balancing means, and has for an object the provision of a simple, economical and easily manufactured device for balancing a grinding wheel, which may be quickly assembled and readily adjusted without moving the wheel from the axis on which it is being balanced, and which involves a rigid wheel center so positioned that previously prepared balancing blocks of substantially uniform construction and mass may be removably fastened thereto in desired numbers on opposite sides thereof, and especially by means of a unitary connector removably insertible into deformable material of a block and capable of producing its own coöperative holding device therein.

With this and other objects in view as will appear from the following disclosure, my invention resides in the combination of parts described in the specification and covered by the claims appended hereto.

Figure 1:
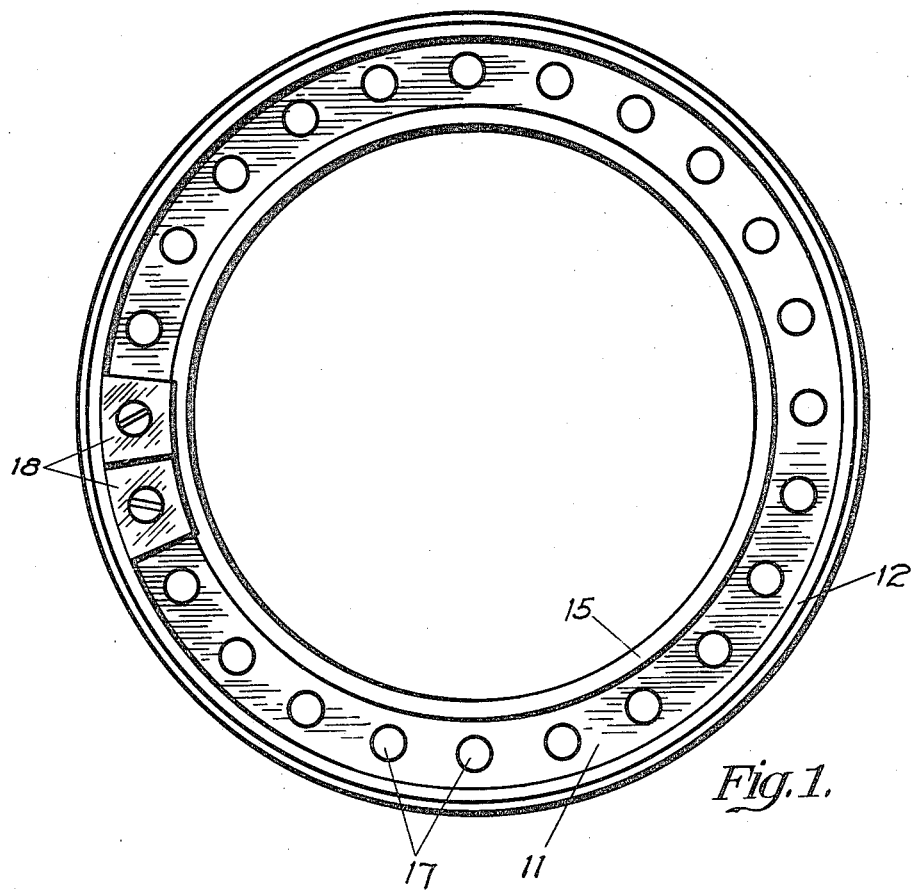
Figure 2:
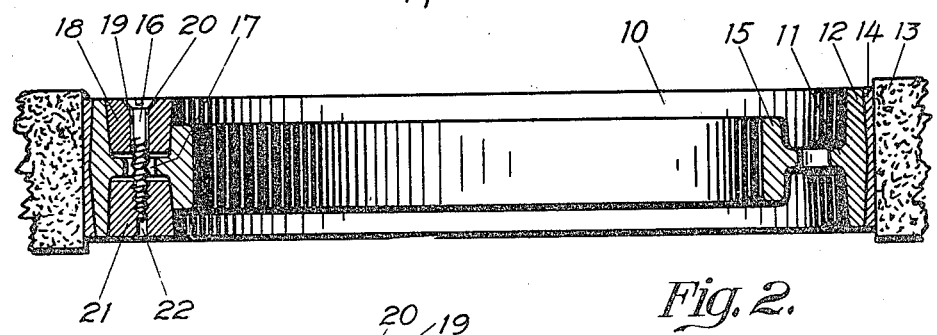
Figure 3:
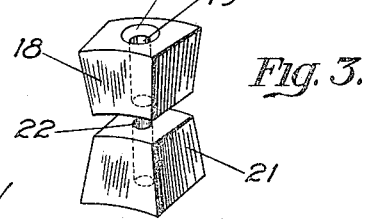

Reference being had to the drawings in which like numerals indicate like parts:

Figure 1. is a plan view of a metal wheel center provided with balancing blocks:

Fig. 2. is a diametrical section of the member shown in Fig. 1, as mounted in a wheel; and Fig. 3. is a perspective view of the balancing blocks.

In the art of grinding, it is necessary that the wheel be in proper balance to prevent imperfect grinding results on the work, and that provision be made for rebalancing the wheel when the center of gravity shifts as the wheel wears away under the grinding process. Various expedients have been tried to overcome the improper balance of a molded wheel but these have hitherto not been entirely successful. One common method involved cutting a hole in the abrasive in the light side of the wheel and filling it with molten lead. It has furthermore been suggested to utilize a hard metal center provided with pockets, into which molten lead may be poured. However, these and other schemes for utilizing molten lead involved an uneconomical and cumbersome cut and try method of mounting a wheel and testing the balance, removing the wheel from its support, pouring molten lead into a pocket, trying the balance again, and perhaps repeating the act. These methods have accordingly proven unsatisfactory in practice because of the large number of operations required and the liability of the wheel being injured and rendered unsafe for rapid rotation. Furthermore, of the numerous devices involving movable or fixed weights hitherto suggested for balancing various rotative bodies none has been found well adapted for use in the grinding art, due to liability of the wheel becoming unbalanced when rotated or because of difficulties in assembling and balancing or thereafter adjusting the balance as the wheel wears away in grinding.

In accordance with my invention, I have provided a construction well adapted for grinding wheels and minus the objectionable features previously encountered, which involves a rigid web mounted in the center of the body of unbalanced abrasive material constituting the grinding wheel and provided with means to hold coöperating blocks firmly and rigidly in any desired positions on opposite sides thereof, the blocks being removable and replaceable in pairs and of predetermined shape and size for properly balancing the abrasive wheel.

As a specific embodiment of my invention, I may utilize the construction shown in the drawings, which involves a rigid ring 10 serving as the wheel center and a carrier for balancing weights. This ring comprises essentially a web portion 11 which may be disposed in the central plane of the wheel, or otherwise located. For the purpose of fastening the ring within an abrasive body, it is provided with an outer flange 12 which may be firmly fixed to the inner periphery of the grinding wheel 13, as by means of an adhesive body 14 or by other suitable means. As illustrated, the web has an inner flange 15, making the wheel center substantially I-shaped, this flange being adapted to be mounted on a spindle.

To balance the wheel, I provide means for supporting blocks or weights in pairs on opposite sides of the web 11 and for holding them rigidly in place. The balancing blocks are designed to be of a suitable size and shape for insertion between flanges 12 and 15 on each side of the web 11, and preferably in snug contact therewith so that the centrifugal force on the block is absorbed by the outer flange. To hold them rigidly and permanently in place until arbitrarily removed, and at the same time to permit of easy removal as well as rapid assembling and balancing operations, I preferably utilize the construction illustrated involving a screw threaded connecting member 16 passing through the web 11 and holding the pair of blocks, one on each side thereof. Perforations 17 are properly spaced around the annular wheel center in the web 11 for passage of the connecting member 16 and are larger than the cross section of said member to permit easy insertion and removal thereof. The distance between the perforations and the block shapes may be so proportioned that blocks fastened through adjacent perforations touch each other with a snug fit.

The blocks are preferably made of a deformable material such as lead, having a high specific gravity, because of the facility and surety with which such material may be forced into rigid contact with the wheel center flange and web and may be readily secured in place by means of an ordinary tapered or wood screw, it being entirely feasible to cause the screw to form its own supporting thread in one of the lead members similar to wood working practices. For example, I may form the upper lead block 18 with a perforation 19 through which the screw will readily pass and preferably with a countersunk portion 20 for the head of the screw. The lower block 21 has a small opening 22 or a recess therein into which the wood screw may pass and form a thread, the opening being smaller than the diameter of the screw, so that the latter is forced to form its thread in the block when screwed into place. While the blocks may be of various shapes, it is preferable to form each slightly tapering toward its inner end and curved to fit the wheel center, as illustrated, and to bevel the wheel flanges correspondingly, so that upon tightening up the screw the blocks may be wedged firmly in place, and, due to the character of the connector 16, be permanently held until forcibly removed.

By utilizing a construction of this type we are enabled to employ a number of balancing blocks and to balance a wheel to any desired extent and to any necessary degree of accuracy. For this purpose it is merely necessary for the operator to mount the wheel on a spindle, note the light side of the wheel, place a pair of balancing blocks on opposite sides of the wheel center in the groove with their perforations alined with one in the web, insert a tapered screw through the block having the larger hole into the other block and drive it into place with a screw driver, the screw forming its coöperating thread in the lead as it goes. Any further necessary balancing of the wheel is accomplished in a similar manner. As the wheel becomes worn in use, it is easy to rebalance the wheel merely by adding or taking away blocks or shifting them to new positions, it being possible to effect a fine balance by employing two pairs of blocks located on opposite sides of the center of the wheel.

Having thus described my invention, what I claim as new and desire to secure by Letters Patent is:—

1. A balanced grinding wheel comprising an unbalanced body of abrasive material, an annular member fixed thereto, a pair of balancing weights on opposite sides of said member and adjustable and removable means passing through said member and coöperating with the weights to hold them rigidly but removably fastened in a desired position on the annular member.

2. A balanced grinding wheel having in combination an unbalanced body of abrasive material, an annular rigid wheel center fixed thereto and comprising a centrally disposed web provided with a series of perforations, a pair of balancing blocks on opposite sides of the web and means inserted through a perforation and rigidly but replaceably connecting said blocks together.

3. A balanced wheel comprising a body, a balancing member connected thereto and comprising a web disposed in the central plane of the wheel, a pair of balancing weights on opposite sides of the web and screw-threaded means passing through the web and engaging the blocks to hold them adjustably but rigidly in place.

4. A balanced grinding wheel comprising an unbalanced mass of abrasive material, a wheel center disposed therein and having a web provided with perforations, a pair of balancing blocks on opposite sides of the web, a screw-threaded member passing through a perforation in the web and means on said center coöperating with said member to removably and rigidly secure said blocks in place.

5. A wheel comprising an annular unbalanced body of abrasive material, a metal center rigidly fixed therein, said center having an annular portion substantially I-shaped in cross section, the web connecting the parallel flanges thereof being centrally disposed within the wheel and having perforations therethrough, balancing blocks fitting between and against said flanges within the lateral planes of the wheel and a screw threaded member projecting through one block and a perforation in the web and engaging threads in an oppositely disposed block to hold the pair rigidly in position.

6. An abrasive wheel comprising an annular unbalanced body of abrasive material, a rigid center mounted within said body, and having a ring of perforations disposed substantially parallel with the central plane of the wheel, a pair of perforated balancing blocks of soft material on opposite sides of a perforation and a tapering screw extending through one block and said perforation into the screw thread formed thereby in the soft material of the wall of the perforation of the other block and holding the blocks firmly on said wheel.

7. A wheel comprising an unbalanced annular mass of abrasive material, an annular center having an outer flange engaging said material, a web perpendicular to the axis of rotation of the wheel and an inner flange adapted to engage a mounting, said web having perforations therein, a pair of balancing weights of soft material perforated to receive a fastening device and engaging said flanges and a tapering screw projecting through one weight and a perforation of the web into the soft material of the other weight to hold the same rigidly together on opposite sides of the wheel center.

8. A grinding wheel comprising an unbalanced abrasive body, an annular member, two blocks on opposite sides of said member, one being of deformable material, and a pointed screw projecting through one weight and said member into contact with threads formed thereby in the deformable block.

Signed at Worcester, Massachusetts, this 25th day of Sept., 1917.

JOHN C. SPENCE.